United States Patent [19]
Trott

[11] 3,820,609
[45] June 28, 1974

[54] REAR-MOUNTED BLADE

[75] Inventor: Clarence Robert Trott, St. Catharines, Ontario, Canada

[73] Assignee: Deere & Company, Moline, Ill.

[22] Filed: June 29, 1972

[21] Appl. No.: 267,507

[52] U.S. Cl. .................. 172/447, 172/666, 172/743
[51] Int. Cl. ............................................ A01b 65/00
[58] Field of Search .......... 172/316, 666, 743, 807, 172/797, 446, 447

[56] References Cited
UNITED STATES PATENTS

| | | | |
|---|---|---|---|
| 975,783 | 11/1910 | Moulthrop | 172/743 X |
| 2,064,022 | 12/1936 | Maloon | 172/807 |
| 2,822,628 | 2/1958 | Arps et al. | 172/447 |
| 3,049,822 | 8/1962 | McMullen | 172/666 X |
| 3,195,249 | 7/1965 | Collins | 172/743 X |
| 3,576,215 | 4/1971 | Cline | 172/447 |
| 3,598,186 | 8/1971 | Coontz | 172/666 |
| 3,613,800 | 10/1971 | Martin | 172/743 X |

*Primary Examiner*—Stephen C. Pellegrino

[57] ABSTRACT

A rear-mounted blade having a mounting frame adapted for attachment to the three-point hitch arms of an agricultural tractor and a generally L-shaped main frame including a longitudinally extending portion connected at its forward end to the mounting frame for pivotal movement about a vertical axis, and a vertically extending portion rigidly fixed to and extending downwardly from the rear end of the longitudinal portion. A pivot pin extends longitudinally through the lower end of the vertical frame portion and has a blade carrier structure mounted thereon for pivotal movement about the axis of the pin, the carrier structure, in turn, having a transversely elongated blade pivotally connected thereto for relative movement about a generally vertical axis. Movement about the longitudinal axis of the pivot pin is imparted to the blade by means of a hydraulic cylinder disposed above the longitudinal frame portion and acting between the frame and one arm of a bell crank mounted thereon, the other arm of the bell crank being connected to the blade carrier structure by means of a vertically extending link.

7 Claims, 4 Drawing Figures

REAR-MOUNTED BLADE

BACKGROUND OF THE INVENTION

The present invention relates generally to tractor-mounted blades and more particularly to an improved frame construction and blade angling apparatus therefor.

A conventional rear-mounted blade for an agricultural tractor includes a mounting frame adapted for attachment to the three-point hitch arms of the tractor, and a main frame connected to and extending rearwardly from the mounting frame and having a transversely elongated blade mounted beneath its rear end portion. The apparatus employed to mount the blade on the rear portion of the main frame typically includes means for adjusting the angle of the blade relative to the main frame about both vertical and longitudinal axes. A common apparatus of this type includes a blade carrier member having a vertical spindle pivotally received by the main frame, the blade being mounted on the lower end of the carrier for relative pivotal movement about a longitudinal axis. Another apparatus of this type consists of a hollow cylindrical member mounted on a longitudinally extending cylindrical end portion of the main frame for movement about the axis thereof, the cylindrical member having a blade carrier member mounted thereon for relative movement about a vertical axis and extending downwardly therefrom, the blade being mounted on the lower end of the carrier.

Although both of these blade mountings generally function adequately to permit adjustment of both blade angle and tilt, neither is entirely satisfactory for use with rear-mounted blades intended for extremely heavy duty use. While both types can be constructed with sufficient strength to absorb the high loads experienced during operation of such a heavy duty blade, it has been found that the resulting cost is excessive. An additional problem exists in connection with apparatus of the vertical spindle-type. Particularly on blades designed for heavy duty use, it is common to provide a hydraulic cylinder for adjusting the lateral tilt of the balde relative to the ground. Since the blade, in this type of apparatus, is pivotal about a longitudinal axis relative to the carrier, and since the carrier is pivotal about a vertical axis relative to the frame, it is necessary to mount the tilt cylinder so that it acts between the carrier and blade. When mounted in this manner, the cylinder is disposed in close proximity to the ground and is thus exposed to soil and other material acted on by the blade.

SUMMARY OF THE INVENTION

Accordingly, it is a primary object of the invention to provide an improved frame construction and blade-mounting apparatus for a rear-mounted blade.

More particularly, it is an object of the invention to provide a low cost frame construction and blade-mounting apparatus characterized by its ability to withstand extremely heavy loads.

It is a further object of the invention to provide such a frame construction and blade-mounting apparatus that is adaptable for use with a hydraulic tilt cylinder mounted in a relatively clean environment on the frame.

It is yet a further object of the invention to provide a hydraulic tilt cylinder apparatus for use with a frame construction and blade-mounting apparatus of the type described, wherein the hydraulic cylinder is mounted in a relatively clean environment on the top side of the frame.

In pursuance of these and other objects, the invention comprises a generally L-shaped frame including a longitudinally extending portion adapted at its forward end for attachment to the rear portion of a tractor and an integral, vertical post rigidly fixed at its upper end to the bottom side of the rear end of the longitudinal portion. A pivot pin extends longitudinally through the lower end of the vertical post and includes front and rear end portions extending forwardly and rearwardly, respectively, of the post. A blade carrier structure forming an upwardly opening box member loosely receives the lower end of the vertical post and is pivotally mounted on the front and rear end portions of the pivot pin. The bottom of the box member is formed by a horizontal plate, the latter being received by support structure on the blade for relative pivotal movement about a vertical axis. The tilt or angle of the blade relative to the ground is controlled by a hydraulic cylinder mounted on the top side of the longitudinal frame portion and acting between the frame and one arm of a bell crank mounted thereon. The other arm of the bell crank is linked to the blade carrier structure to tilt the blade in response to extension or retraction of the hydraulic cylinder.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
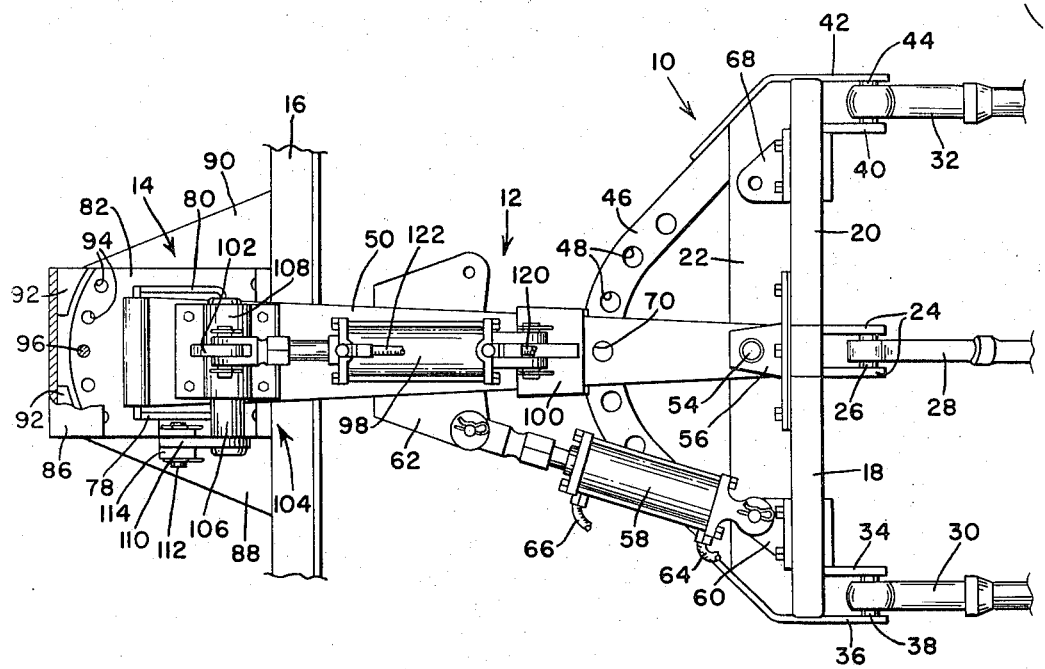
FIG. 1 is a plan view of a rear-mounted blade constructed in accordance with the principles of the invention, with portions broken away for the sake of clarity.
Figure 2:
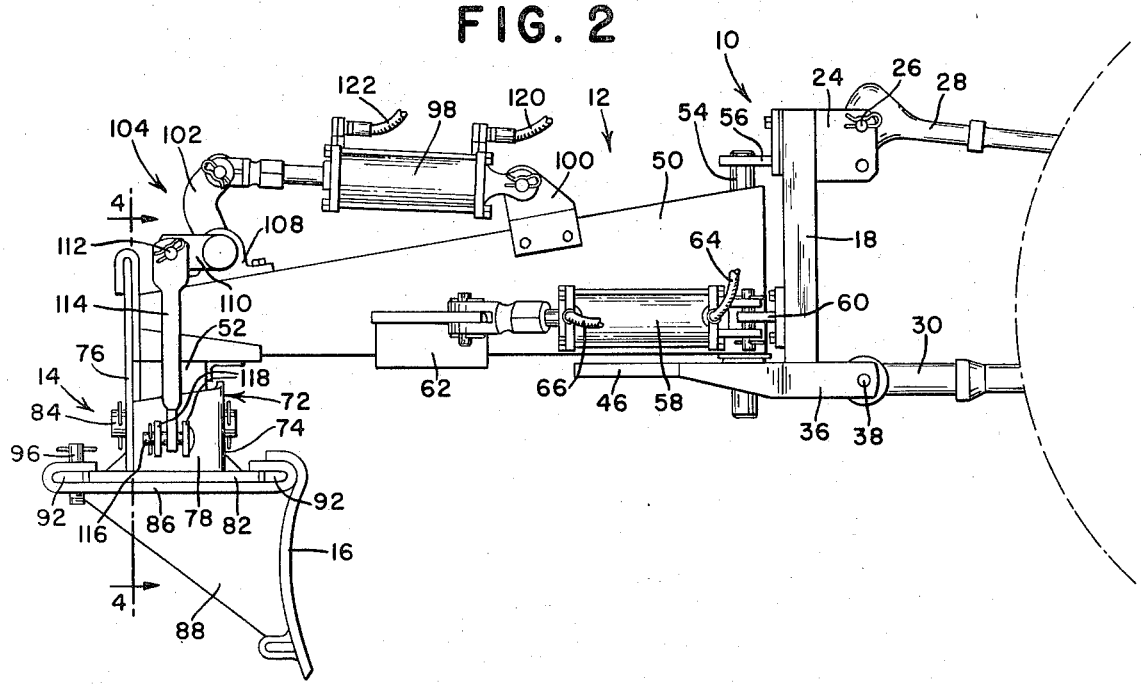
FIG. 2 is a right side elevational view of the rear-mounted blade.

In the ensuing description, right- and left-hand reference is determined by facing the normal direction of travel of the implement.

The rear-mounted blade illustrated comprises, generally, a mounting frame 10, an L-shaped main frame 12, a blade carrier frame 14, and a blade 16. The mounting frame 10 has a generally triangular shape formed by right and left side members 18 and 20, respectively, joined at their upper ends and diverging downwardly to opposite ends of a transverse base member 22. A pair of transversely spaced vertical plates 24 are mounted on the front side of the upper ends of the members 18 and 20 and are apertured to receive a mounting pin 26. The upper arm 28 of a conventional agricultural tractor three-point hitch extends between the plates 24 and is connected to the pin 26. The right and left lower arms 30 and 32, respectively, of the tractor three-point hitch are similarly connected to the lower ends of the members 18 and 20, respectively. An inner and outer pair of vertical plates 34 and 36, respectively, are fixed to the front side of the lower end of the right side member 18 and are apertured to receive a mounting pin 38 which, in turn, is received by the end of the arm 30. In like manner, an inner and outer pair of plates 40 and 42, respectively, are fixed to the front side of the lower end of the left side member 20 and are apertured to receive a mounting pin 44 which, in turn, is received by the end of the arm 32. A horizontal, arcuate member 46 is fixed at its ends to the ends of the base member 22, and is provided with a plurality of angularly spaced apertures 48 therein for a purpose which will subsequently appear.

Figure 3:
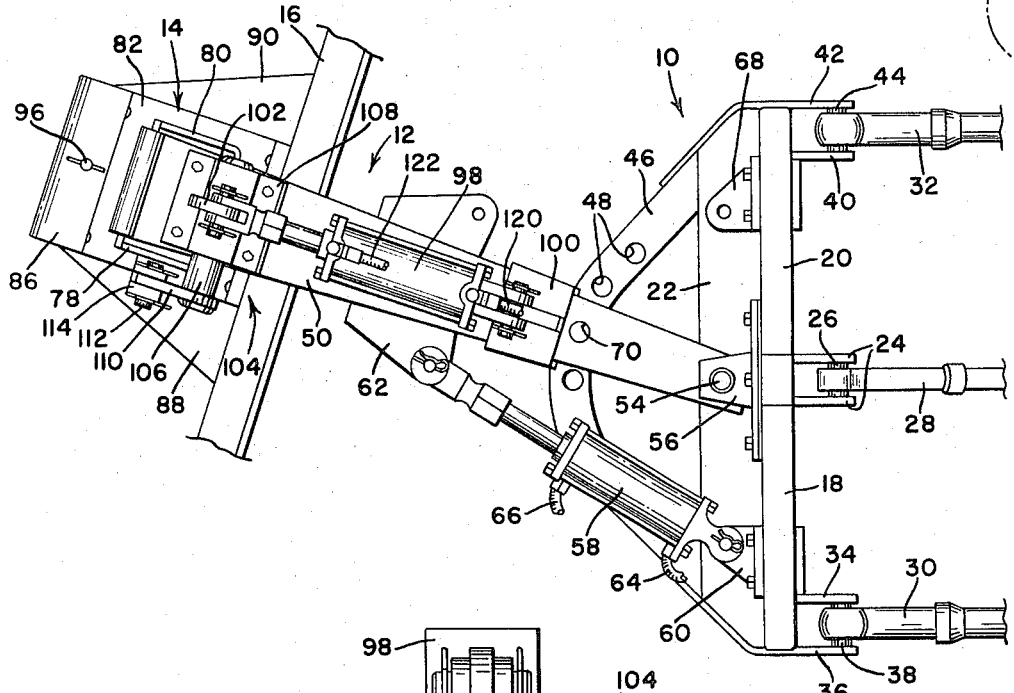
FIG. 3 is a plan view similar to FIG. 1, with the main frame swung to the left.

The L-shaped main frame 12 is composed of a longitudinally extending, tapered beam 50 and a vertical post 52 rigidly fixed at its upper end to the bottom side of the extreme rear portion of the beam 50. A vertical pivot pin 54 extends through the upper and lower walls of the forward end of the beam 50, the upper end of the pin being received in an apertured support 56 bolted to the back side of the members 18 and 20, and the lower end of the pin being received in an aperture in the base member 22. The main frame 12 is swung about the axis of the pivot pin 54 relative to the mounting frame 10 to adjust the lateral position of the blade 16 by means of a hydraulic cylinder 58, the latter acting between a bracket 60 bolted to the lower end of the member 18 and the right side of a U-shaped bracket 62 fixed to the bottom side of the beam 50. Hydraulic fluid under pressure from the tractor hydraulic system is introduced into the cylinder 58 through hoses 64 and 66 to effect extension and retraction thereof. As illustrated in FIG. 3, the cylinder is extensible to swing the main frame 12, and thereby the blade 16, to the left. An additional cylinder bracket 68 is mounted on the lower end of the left side member 20 so that the cylinder 58 can be alternately mounted to act between the bracket 68 and the left side of the bracket 62, in which event its extension would cause the main frame 12 to swing to the right. In absence of the cylinder 58, the main frame can be manually swung about the axis of the pin 54 and secured by means of a vertical pin extending through an aperture 70 in the upper and lower walls of the beam 50, in various angularly spaced positions of adjustment defined by the pin-receiving apertures 48 in the arcuate member 46.

Figure 4:
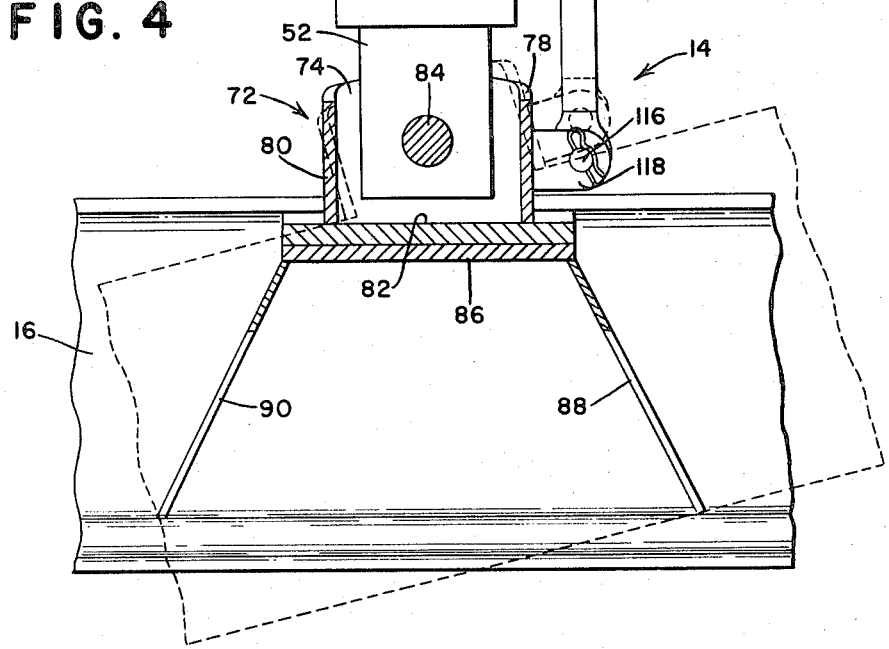
FIG. 4 is an enlarged cross-sectional view taken along the line 4—4 of FIG. 2.

The blade carrier frame 14 comprises an upwardly opening box member 72 formed by a front wall 74, a rear wall 76, and right and left side walls 78 and 80, respectively, the walls being enclosed at their lower ends by means of a horizontal plate 82. As illustrated best in FIG. 4, the vertical post 52 of the main frame 12 extends down into the box member 72 and is pivotally mounted therein on a pivot pin 84 extending longitudinally through the post and through the box member walls 74 and 76. As illustrated in dotted lines in FIG. 4, the lateral clearance between the upper edges of the side walls 78 and 80 and the side of the post 52 is sufficient to permit the carrier frame to swing through a substantial angle about the pin 84.

The blade 16 is connected to the blade carrier frame 14 for relative pivotal movement about a generally vertical axis. A horizontal plate 86 extends rearwardly from the upper central portion of the blade 16 and is supported relative thereto by means of right and left triangular plates 88 and 90, respectively. The upper surface of the plate 86 contacts the lower surface of the plate 82 and the front and rear edge portions of the former are bent over the top of the respective arcuate edges of the latter. A triangular spacer 92 is disposed at each of the corners of the plate 86 so that the plate 82 is constrained to rotate about a vertical axis relative to the plate 86. As shown in FIG. 1, a plurality of angularly spaced apertures 94 are provided along both the front and rear arcuate edges of the plate 82, the apertures 94 being alignable with a single aperture in the plate 86 to define the various positions of adjustment of the blade 16 about a vertical axis. A removable pin 96 is receivable by the aligned apertures to retain the blade in a selected position of adjustment.

Adjustment of the blade tilt or angle about the axis of the longitudinal pivot pin 84 is effected by an extensible and retractable hydraulic cylinder 98 mounted directly above the beam 50 and acting between a bracket 100 fixed to the top side of the beam and an upwardly extending arm 102 forming part of a bell crank means 104. The bell crank means additionally comprises a transverse shaft 106 rotatably mounted in a bearing member 108 bolted to the top wall of the beam 50, and a rearwardly extending arm 110 fixed to the right outer end of the shaft 106. A pin 112 mounts the upper end of a vertical link member 114 to the rear of the arm 110, and a pin 116 mounts the lower end of the link to a pair of brackets 118 fixed to the side wall 78 of the box member 72. It will be apparent that extension and retraction of the hydraulic cylinder 98 will cause the outer end of the bell crank arm 110 to move through a vertical arc about the axis of the shaft 106, and that such vertical movement will be transmitted to the blade carrier frame 14 by the link 114, causing the blade carried frame, and thereby the blade 16 mounted thereon, to pivot about the axis of the longitudinal pin 84 as shown in dotted lines in FIG. 4. Hydraulic fluid under pressure, for effecting extension and retraction of the cylinder 98, is supplied to the cylinder through hoses 120 and 122 from a source on the tractor.

The angle of the blade 16 about the axis of the pivot pin 84 may also be adjusted manually without the use of the hydraulic cylinder 98. In such event, a removable pin (not shown) may be inserted in angularly spaced apertures 124 formed in the upper end of a plate 126 secured to the end of the beam 50 and apertures alignable therewith in the upper end of the wall 76, to retain the blade in a selected position of adjustment.

I claim:

1. Rear-mounted blade means comprising: a generally L-shaped rigid frame including a longitudinally extending portion adapted at its forward end for attachment to the rear of a tractor and a vertically extending portion fixed at its upper end to the rear of the longitudinal portion and extending downwardly therefrom; a longitudinally extending pivot pin received in the vertical portion of said frame; blade carrier structure; means mounting said blade carrier structure on said pivot pin for pivotal movement about the axis thereof; an elongated blade; means mounting said blade on said blade carrier structure for pivotal movement about a generally vertical axis; bell crank means mounted on the rear end of the longitudinal frame portion and having a first arm extending upwardly to an upper end disposed above the top side of the longitudinal frame portion, and a second arm extending longitudinally to an outer end disposed transversely outwardly from one side of the longitudinal frame portion; an extensible and retractable hydraulic cylinder disposed above the top side of the longitudinal frame portion and interconnecting said frame portion and the upper end of said first arm, said hydraulic cylinder being operative to pivot said bell crank means and thereby move the outer end of said second arm through a vertical arc; and a vertically extending link interconnecting the outer end of said second arm and said blade carrier structure to pivotally move the latter and thereby the blade about the axis of said pin in response to pivotal movement of said bell crank means.

2. The invention defined in claim 1 wherein said blade carrier structure comprises an upwardly opening box member loosely receiving the lower end of the vertically extending portion of the L-shaped rigid frame, the front and rear walls of said box member being pivotally mounted on the front and rear end portions, respectively, of said pin.

3. The invention defined in claim 2 wherein the bottom wall of said box member comprises a substantially horizontal plate extending forwardly from the front wall of said box member and rearwardly from the rear wall of said box member; and including support structure mounted on said blade and receiving the front and rear portions of said horizontal plate for pivotal movement of said plate relative to said support structure about a generally vertical axis.

4. Rear-mounted blade means comprising: a generally L-shaped frame including a longitudinally extending portion adapted at its forward end for attachment to the rear of the tractor, and an integral, vertical post rigidly fixed at its upper end to the bottom side of the rear end of the longitudinal portion; a pivot pin extending longitudinally through said post and having front and rear end portions extending forwardly and rearwardly, respectively, of said post; blade carrier structure including an upwardly opening box member loosely receiving the lower end of said vertical post, the front and rear walls of said box member being pivotally mounted on the front and rear end portions, respectively, of said pin, and the bottom wall of said box member including a substantially horizontal plate extending forwardly from the front wall of said box member and rearwardly from the rear wall of said box member; an elongated blade; and support structure mounted on said blade and receiving the front and rear portions of said horizontal plate for pivotal movement of said plate relative to said support structure about a generally vertical axis.

5. The invention defined in claim 4 including means for pivotally moving said blade carrier structure and blade about the axis of said pin comprising bell crank means pivotally mounted on the rear end of the longitudinal frame portion and having a first arm portion extending upwardly to an upper end and a second arm portion extending longitudinally to an outer end; extensible and retractable means interconnecting the upper end of said first arm portion and the longitudinal portion of the frame, said extensible and retractable means being operative to pivot said bell crank means and thereby move the outer end of said second arm portion through a vertical arc; and a vertically extending link interconnecting the outer end of said second arm portion and said blade carrier structure to pivotally move the latter and thereby the blade about the axis of said pin in response to pivotal movement of said bell crank means.

6. Rear-mounted blade means comprising: a generally L-shaped rigid frame including a longitudinally extending portion adapted at its forward end for attachment to the rear of a tractor and a vertically extending portion fixed at its upper end to the rear end of the longitudinal portion and extending downwardly therefrom; a longitudinally extending pivot pin received in the vertical portion of said frame; blade carrier structure mounted on said pivot pin for pivotal movement about the axis thereof; an elongated blade; means mounting said blade on said blade carrier structure for pivotal movement about a generally vertical axis; bell crank means pivotally mounted on the rear end of the longitudinal frame portion and having a first arm portion extending upwardly to an upper end and a second arm portion extending longitudinally to an outer end; extensible and retractable means interconnecting the upper end of said first arm portion and the longitudinal portion of the frame, said extensible and retractable means being operative to pivot said bell crank means and thereby move the outer end of said second arm portion through a vertical arc; and a vertically extending link interconnecting the outer end of said second arm portion and said blade carrier structure to pivotally move the latter and thereby the blade about the axis of said pin in response to pivotal movement of said bell crank means.

7. The invention defined in claim 6 wherein said extensible and retractable means comprises an extensible and retractable hydraulic cylinder, said hydraulic cylinder being disposed directly above the frame.

* * * * *